(12) United States Patent  
Michaelraj et al.

(10) Patent No.: US 9,569,859 B2  
(45) Date of Patent: Feb. 14, 2017

(54) SYSTEM AND METHOD FOR REDEFINING DEPTH-BASED EDGE SNAPPING FOR THREE-DIMENSIONAL POINT SELECTION

(71) Applicant: Dell Products, LP, Round Rock, TX (US)

(72) Inventors: Jeyprakash Michaelraj, San Jose, CA (US); Maxwell S. Andrews, San Francisco, CA (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 14/584,622

(22) Filed: Dec. 29, 2014

(65) Prior Publication Data

US 2016/0189386 A1 Jun. 30, 2016

(51) Int. Cl.
*G06K 9/00* (2006.01)
*G06T 7/60* (2006.01)
*G06T 7/00* (2006.01)

(52) U.S. Cl.
CPC ............. *G06T 7/602* (2013.01); *G06T 7/0083* (2013.01); *G06T 2207/10012* (2013.01); *G06T 2207/10028* (2013.01); *G06T 2207/20101* (2013.01)

(58) Field of Classification Search
CPC ................ G06T 7/0063; G06T 7/0075; G06T 2207/20092; G06T 2207/10028

USPC ....... 382/154; 345/419–427; 356/12; 348/42
See application file for complete search history.

(56) References Cited

U.S. PATENT DOCUMENTS

| 2007/0285672 | A1* | 12/2007 | Mukai | G01B 11/2518 356/603 |
| 2008/0180454 | A1* | 7/2008 | Sim | G06T 15/205 345/582 |
| 2009/0027387 | A1* | 1/2009 | Furuhashi | G06T 15/20 345/421 |
| 2013/0076749 | A1* | 3/2013 | Maeda | G06T 15/08 345/424 |
| 2013/0106848 | A1* | 5/2013 | Nguyen | H04N 13/0011 345/419 |

* cited by examiner

*Primary Examiner* — Samir Ahmed
(74) *Attorney, Agent, or Firm* — Prol Intellectual Property Law, PLLC; H. Kenneth Prol

(57) ABSTRACT

An information handling system includes a three dimensional camera and a processor. The three dimensional camera is configured to capture a three dimensional image. The processor is configured to provide the three dimensional image to be displayed on a display screen of the information handling system, to detect a selection of a pixel within the three dimensional image, and to redefine the selected pixel to be a second pixel. The second pixel has a large disparity within the three dimensional image or its two dimensional counterpart.

20 Claims, 7 Drawing Sheets

SYSTEM AND METHOD FOR REDEFINING DEPTH-BASED EDGE SNAPPING FOR THREE-DIMENSIONAL POINT SELECTION

CROSS-REFERENCE TO RELATED APPLICATION(S)

The present application is related to co-pending U.S. patent application Ser. No. 14/584,587, entitled "SYSTEM AND METHOD FOR DETERMINING DIMENSIONS OF AN OBJECT IN AN IMAGE" filed on Dec. 29, 2014, the entirety of which is herein incorporated by reference.

FIELD OF THE DISCLOSURE

The present disclosure generally relates to a system and method for three dimensional point selection within three dimensional images.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Information handling systems, such as tablet computers, can include a camera to take pictures, which in turn can be stored within the information handling system. The camera can be a digital camera that can include metadata associated with the image, and the metadata can include different information about the image.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
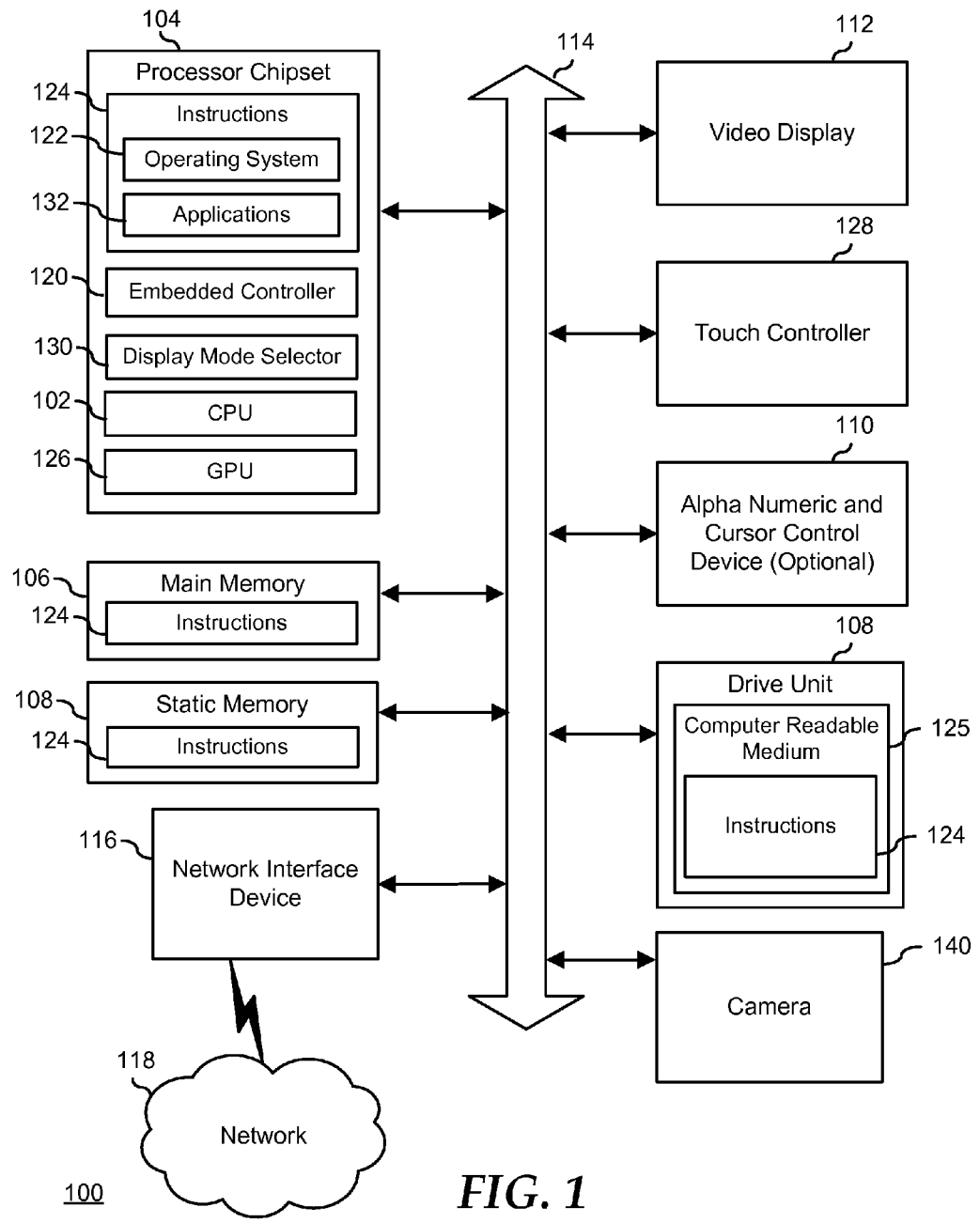
FIG. 1 is a block diagram of an information handling system according to a particular embodiment of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The information handling system can include a camera to capture images in the information handling system, such as a three-dimensional (3-D) camera, e.g., a stereo triangulation camera, a sheet of light triangulation camera, a structured light camera, a time-of-flight camera, an interferometry camera, a coded aperture camera, or any other type of 3-D camera known in the art. In an embodiment, a display screen of the information handling system can display an image selected by an individual, such as an image previously captured by the camera. A processor of the information handling system can select an object within the image. In an embodiment, there can be multiple ways that an object in the image can be selected: a processor of the information handling system can automatically select an object; an individual can click on a point in the image; an individual can draw a circle around the object; or the like.

When the processor detects a selection of an object, the processor can detect disparity between pixels of the image to determine an edge of the selected object. This disparity threshold may be determined from 3-D scene information. For example, if a Z-dimension is increased by a large amount between adjacent pixels in an X or Y dimension, this may indicate an edge of an object. The threshold may also be based upon 2-D pixel data in the form of high contrast areas, if there is no significant disparity in 3-D information. For example, a picture hanging on the wall will have very little Z-axis difference between the frame and the wall itself, but will have a clearly visible 2-D border that can be used instead, to determine the bounds of the object. The processor can then determine exact end points for each line that defines a different dimension of the selected object. The processor can then retrieve the (X,Y,Z) coordinates for the different end points. The processor can then calculate a distance between points based on the difference between (X,Y,Z) coordinates of these points. Statistical sampling methods may be employed to sample additional similar points to increase the confidence and accuracy of the computed dimensions. Multiple linear samples may be integrated to display area measurements as well as line measurements. Linear measurements may contain multiple waypoints to allow linear measurements of curved or organically shaped objects. After the distances between the points are calculated, the processor can display a wireframe around the object and include these values as the dimensions of the object along lines of the displayed wireframe. Thus, the information handling system can utilize (X,Y,Z) coordinates of points within a 3-D image displayed on the display screen to calculate and display the dimensions of an object without any interaction from an individual, or with only a single input from the individual to generally suggest an object of interest.

In an embodiment, when an individual clicks on a particular point or pixel in the image, the processor can determine whether that point is located at a point of disparity with respect to an adjacent point or pixel within the 3-D image, based on either disparity in 3-D position, or disparity of 2-D red-green-blue (RGB) values, such as contrast. If the selected point is not located at a large disparity, the processor can then determine whether the point is located within a particular distance from a point or pixel having a large disparity. If the selected point is within the particular distance or radius of point with a large disparity, the processor can then redefine the location of selected point to be the point that has the largest disparity within that particular distance.

The processor can then determine an additional point or points located at areas of large disparity along a line defining a length of an object associated with the redefined point(s). The resulting lines may be simple and straight segments, having one starting point and one end point, or may be complex and organic, shaped by multiple waypoints. The processor can utilize the (X,Y,Z) coordinates of points on an object to determine multiple dimensions of the object. In an embodiment, an individual can draw a line within the displayed image that the individual would like to have the length of the line calculated in physical distance units.

When an individual draws a line between points in the image, the processor can determine whether the two end points of the line are located at points of disparity within the 3-D or 2-D image. If one or both the selected points at the end of line are not located at points of large disparity, the processor can then determine whether each of the points is located within a particular distance from a point or pixel having a large disparity. The processor can then redefine the location of two selected points to be points with large disparities. The processor can then utilize the (X,Y,Z) coordinates of the redefined points at both ends of the drawn line to determine the distance between two objects in the image.

FIG. 1 shows an information handling system 100 including conventional information handling systems components of a type typically found in client/server computing environments. The information handling system 100 may include memory, one or more processing resources such as a central processing unit (CPU) 102 and related chipset(s) 104 or hardware or software control logic. Additional components of system 100 may include main memory 106, one or more storage devices such as static memory or disk drives 108, an optional external input device 110 such as a keyboard, and a cursor control device such as a mouse, or a video display 112. The information handling system 100 may also include one or more buses 114 operable to transmit communications between the various hardware components.

More specifically, system 100 represents a mobile user/client device, such as a dual screen mobile tablet computer. System 100 has a network interface device 116, such as for a wireless cellular or mobile networks (CDMA, TDMA, etc.), WIFI, WLAN, LAN, or similar network connection, enabling a user to communicate via a wired or wireless communications network 118, such as the Internet. System 100 may be configured with conventional web browser software. The web browser, may include for example Microsoft Corporation's Internet Explorer web browser software, Firefox or similar such browsers to allow the user to interact with websites via the wireless communications network 118.

System 100 may include a several sets of instructions 124 to be run by CPU 102 and any embedded controllers 120 on system 100. The instructions 124 can be stored in a computer readable medium 125 of a drive unit 108. One such set of instructions includes an operating system 122 with operating system interface. Example operating systems can include those used with typical mobile computing devices such as Windows Phone mobile OS from Microsoft Corporation and Android OS from Google Inc., for example Key Lime Pie v. 5.x. Additional sets of instructions in the form of multiple software applications 124 may be run by system 100. These software applications 124 may enable multiple uses of the dual display information handling system as set forth in more detail below.

System 100 includes a display screen 112. The display screen 112 has a display driver operated by one or more graphics processing units (GPUs) 126 such as those that are part of the chipset 104. The display screen 112 also has an associated touch controller 128 to accept touch input on the touch interface of the display screen.

The display screen 112 may also be controlled by the embedded controller 120 of chipset 108. Each GPU 126 and display driver is responsible for rendering graphics such as software application windows and virtual tools such as virtual keyboards on the display 112. Control of the location and positioning of these windows may be set by user input to locate the screens or by control setting default. In several embodiments described herein, control of the location for rendering for software application windows and virtual tools in the display may be determined by an application window locator system as described further in the embodiments herein. The application window locator system determines operating state rank of running software applications and determines whether and where to display application display windows and virtual tools based on relative orientation and state of usage information. Windows may include other forms of display interface with software application besides a window. It is contemplated that tiles, thumbnails, and other visual application access and viewing methods via a display are contemplated to be considered windows. Virtual tools may include virtual keyboard, virtual touchpad or controller, virtual buttons and other input devices rendered via a display screen and accepting feedback via a touch control system.

In another example of display control via the disclosures herein, the power to the display screen 112 is controlled by an embedded controller 120 in the processor chipset(s) which manages a battery management unit (BMU) as part of a power management unit (PMU) in the BIOS/firmware of the main CPU processor chipset(s). These controls form a part of the power operating system. The PMU (and BMU) control power provision to the display screen and other components of the dual display information handling system.

A display mode selector 130, in connection with an application window locator system as described in more detail below, determines priority of concurrently running software applications and how to automatically locate software application display windows and virtual tools on the screen via the chipset 104 based upon orientation of the display screen 112 as well as the software applications 132 currently running and active and their status. Determining which applications 132 are running determines a working software application context. Alternatively, the application window locator may operate on an embedded controller 120 separate from the main CPU chipset(s) 104. Additionally, the power management application may receive state of usage activity input from device state sensors.

System 100 of the current embodiment has a camera 140 to capture images in the information handling system 100. In an embodiment, the camera 140 can be a three-dimensional (3-D) camera, such that when the camera captures images (X,Y,Z) coordinates for each pixel of the image can be computed and stored. In another embodiment, the GPU 126, or other processor of the information handling system 100, can communicate with the camera 140 to receive the captured images and to calculate the distances for pixels in the newly captured images. The images and associated metadata can be stored in a memory of the information handling system 100, such as a flash memory, the static memory 108, the main memory 106, or the like.

In an embodiment, the camera 140 can be a multiview stereo camera that may include multiple apertures that can each capture the image from a different angle of view with respect to the other apertures of the camera. The different angles of view can cause a shift (parallax) in the (X,Y,Z) coordinates for each pixel in the image. For example, the pixel located at point 201, in FIG. 2, can have coordinates of $(X_1,Y_1,Z_1)$ when captured by a first aperture of the camera 140, can have the coordinates of $(X_2,Y_2,Z_2)$ when captured by a second aperture of the camera, and can have the coordinates of $(X_3,Y_3,Z_3)$ when capture by a third aperture of the camera. The difference, or parallax, between the coordinates from each of the apertures can be utilized to determine an absolute distance that the pixel at point 201 is from the camera 140, in physical units such as metric or imperial units. The calculation of the distance can be based on a calibration file that models the relationship(s) of the aperture(s), stored in a memory of the information handling system 100. In another embodiment, the camera 140 can use any other known method to assign distances to pixels in a 3-D image, such as sonar, radar, or the like, without varying from the scope of this disclosure. In an embodiment, the calibration file can be generated by acquiring multiple images of an object at multiple distances and angles to the camera 140. The calibration file can then model the relative offsets and transforms between the images at multiple distances, and once this relationship is understood, compute a physical dimension from a certain offset of pixels between images.

In an embodiment, the display screen 112 can display an image selected by an individual such as an image previously captured by the camera 140. The GPU 126 can retrieve the image from memory, such as memory 108, and can provide the image to the display screen 112 as shown in FIG. 2.

Figure 2:
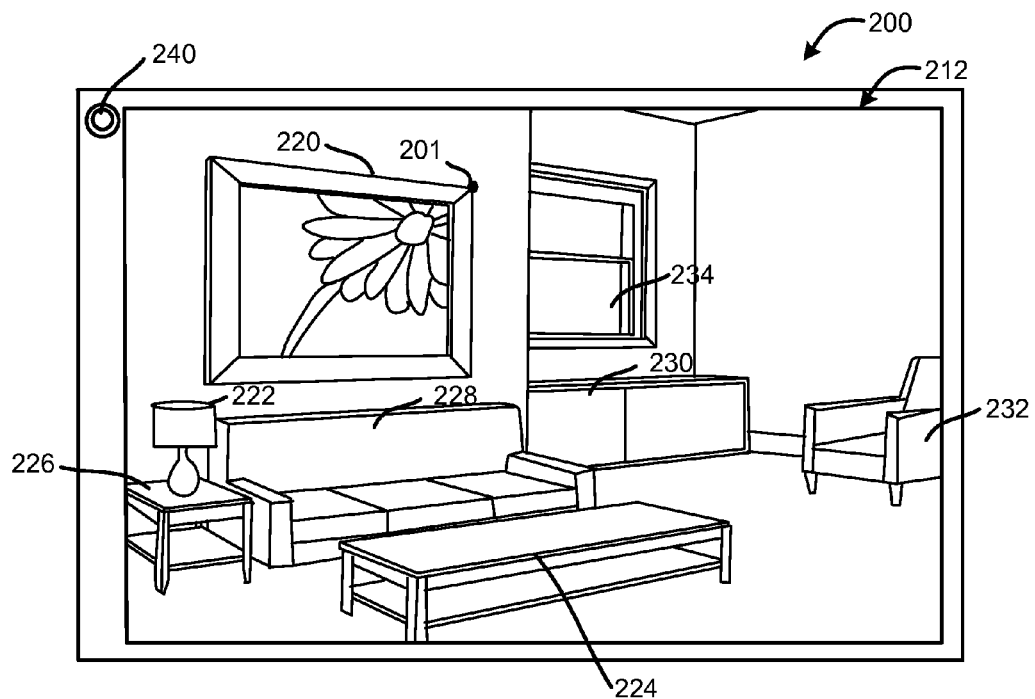
FIGS. 2-5 are diagrams of different screen shots on a display of the information handling system according to a particular embodiment of the disclosure.

FIG. 2 illustrates an information handling system 200 including a display screen 212, which in turn provides a 3-D image according to a particular embodiment of the disclosure. The image displayed on the display screen 212 can include multiple objects, such as a picture 220, a lamp 222, a coffee table 224, an end table 226, a couch 228, a cabinet 230, a chair 232, and a window 234. Depending on the angle that the image is taken from with respect to the objects 220-234, one or more objects, such as the picture 220 and window 234, may not include enough shift in one coordinate to be able to calculate a value for the corresponding dimension. For example, the Z coordinate of the picture 220 may not have enough disparity be able to separate the depth of the picture from the wall on which it is mounted. A processor of the system 100, such as the CPU 102, the GPU 126, the embedded controller 120, or the like, can operate to interface with the touch controller 128 to receive and process inputs received on the display screen 212 from an individual. For example, the processor 102 can interface with the touch controller 128 to receive a selection of an object within the image and an input indicating that the individual would like to have the dimensions of the selected object calculated. However, as discussed below, the dimensions of an object can only be calculated if at least one edge of each dimension is visible in the image. In another embodiment, the processor 102 can automatically select an object in the image and calculate the dimensions of the object without any interaction with the individual.

Figure 3:
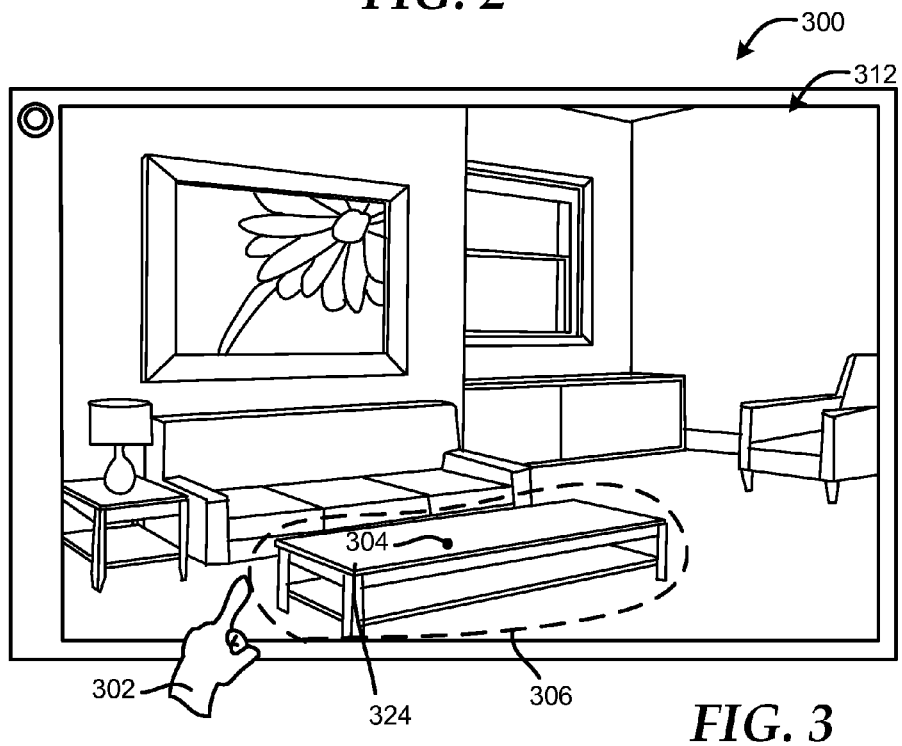

FIG. 3 illustrates an information handling system 300 including a display screen 312, which in turn provides a 3-D image according to a particular embodiment of the disclosure. In this embodiment, an individual can utilize his or her finger 302 to interface with the display 312 and the touch controller 128, of FIG. 1, to select an object within the displayed image that the individual would like to have the dimensions of calculated. In an embodiment, the individual can place the information handling system 200 into an object selection mode while viewing the image on the display screen 312, can open the image in a particular application 132 for selection of an object, or the like. In an embodiment, during the object selection mode there can be multiple ways that an object in the image can be selected: a processor of the information handling system can automatically select a prominent object; an individual can click on a point 304 in the image; an individual can draw a circle 306 around the object; or the like.

When an individual clicks on a particular point 304 in the image to select an object, such as the table top of coffee table 324, a processor of the information handling system 300 can then determine an object associated that the point 304. The individual can click on the point 304 by utilizing a mouse or other pointing device, the finger 302, a stylus, or the like. If the individual chooses to draw the circle 306 around the desired object, the individual can use a pointing device, finger 302, stylus, or the like. In response to the selection 306 being drawn, the processor 102 can determine an object located entirely or partially within the selected area. The processor 102 can then determine whether at least two endpoints of each dimension of the selected object are visible in the image. For example, the table 324 has two legs that are fully visible so that the height of the table can be determined, and the entire table top is visible to calculate the length and width of the table.

If a processor of the information handling system 300 is configured to automatically determine an object, the processor can determine a prominent object of the image that has at least two endpoints of each dimension visible. Thus, the processor 102 can identify a selected object with either no interaction from the individual, such as automatic selection, or only one interaction from the individual, such as clicking a point or drawing an arbitrary selection. After the processor 102 makes a determination of an object selected by the individual or the processor itself, the processor can determine end points for different lines that define the dimensions of the object. For example, the processor can determine that points 402 and 404 are end points for the depth or width of the table 324, that points 404 and 406 are end points for the length of the table, and that points 406 and 408 are end points for the height of the table as shown in FIG. 4.

Figure 4:
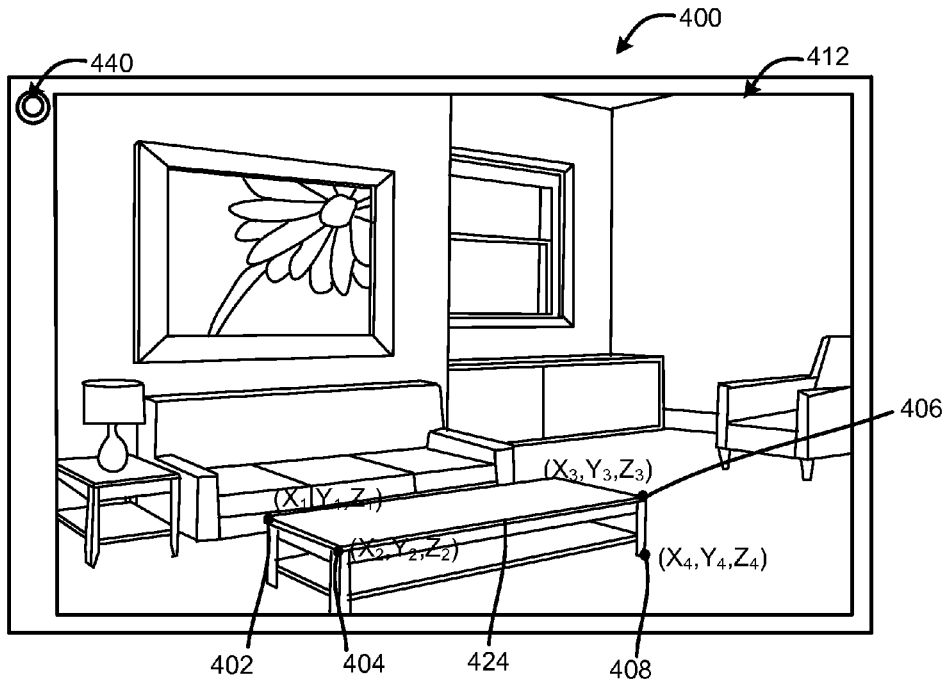

FIG. 4 illustrates an information handling system 400 including a camera 440 and a display screen 412, which in turn provides a 3-D image according to a particular embodiment of the disclosure. The processor 102, of FIG. 1, of the information handling system 400 can determine the outer most points for each line defining a particular dimension of the desired object, such as table 424. For example, the processor 102 can determine that points 402 and 404 are the outer most points of a line defining the depth or width of the table 424, that points 404 and 406 are the outer most points of a line defining the length of the table 424, and that points 406 and 408 are the outer most points on a line that defines the height of the table 424. In different embodiments, the processor 102 can either display the points 402-408 on the image, or can determine the points without displayed the points on the image. However, for clarity, the points 402-408 are shown in FIG. 4 and will be discussed with reference to FIG. 4.

In an embodiment, the processor 102 can detect disparities between the pixels at each end of the line defining the depth or width of the table 424. For example, the Z-dimension of adjacent pixels many have a large disparities, such that there is a large difference between the Z coordinate of one pixel as compared to an adjacent pixel. In another embodiment, the detected disparity can be a large change in the color of pixels from one pixel to the next adjoining pixel. Thus, the processor 102 can determine that points 402 and 404 are the pixels that are located at the end of the line defining the depth or width of the table 424. The processor 102 can then determine the distance each of the points 402 and 404 is within the image based on the (X,Y,Z) coordinates for points 402 and 404. For example, if the camera 440 is a multi-view camera with multiple apertures, the coordinates for point 402 can be $(X_{1a},Y_{1a},Z_{1a})$, $(X_{1b},Y_{1b},Z_{1b})$, and $(X_{1c},Y_{1c},Z_{1c})$. The camera 140, or the processor 102, can determine a shift in each of these coordinates, and can then compare the detected shift in the coordinates for point 402 to the calibration file to determine the absolute distance point 402 is within the image.

The processor 102 can then detect the coordinates for point 404 as generated from each of the lenses of the camera 440. For example, the coordinate for point 404 can be $(X_{2a},Y_{2a},Z_{2a})$, $(X_{2b},Y_{2b},Z_{2b})$, and $(X_{2c},Y_{2c},Z_{2c})$. The camera 140, or the processor 102, can determine a shift in each of these coordinates, and can then compare the detected shift in the coordinates for point 404 to the calibration file to determine the distance point 404 is within the image. The processor 102 can then calculate a distance between points 402 and 404 based on the difference between the determined distances of points 402 and 404. The processor 102 can then store a value for the distance between points 402 and 404 as the width of the table 424.

The processor 102 can utilize the previously determined distance of point 404 for the calculation of the length of the table 424. The processor 102 can then determine the distance the point 406 is within the image based on the (X,Y,Z) coordinates for point 406. For example, the coordinates for point 406 can be $(X_{3a},Y_{3a},Z_{3a})$, $(X_{3b},Y_{3b},Z_{3b})$, and $(X_{3c},Y_{3c},Z_{3c})$. The camera 140, or the processor 102, can determine a shift in each of these coordinates, and can then compare the detected shift in the coordinates for point 406 to the calibration file to determine the distance point 406 is within the image. The processor 102 can then calculate a distance between points 404 and 406 based on the difference between the determined distances of points 404 and 406. The processor 102 can then store a value for the distance between points 404 and 406 as the length of the table 424.

While calculating the height of the table 424, the processor 102 can utilize the previously determined distance of point 406. The processor 102 can then determine the distance each of the point 408 is within the image based on the (X,Y,Z) coordinates for point 406. For example, the coordinates for point 406 can be $(X_{4a},Y_{4a},Z_{4a})$, $(X_{4b},Y_{4b},Z_{4b})$, and $(X_{4c},Y_{4c},Z_{4c})$. The camera 140, or the processor 102, can determine a shift in each of these coordinates, and can then compare the detected shift in the coordinates for point 408 to the calibration file to determine the distance point 408 is within the image. The processor 102 can then calculate a distance between points 406 and 408 based on the difference between the determined distances of points 406 and 408. The processor 102 can store the width, length, and height of the table 424 in a memory, such as memory 108 of FIG. 1, for later use.

Figure 5:
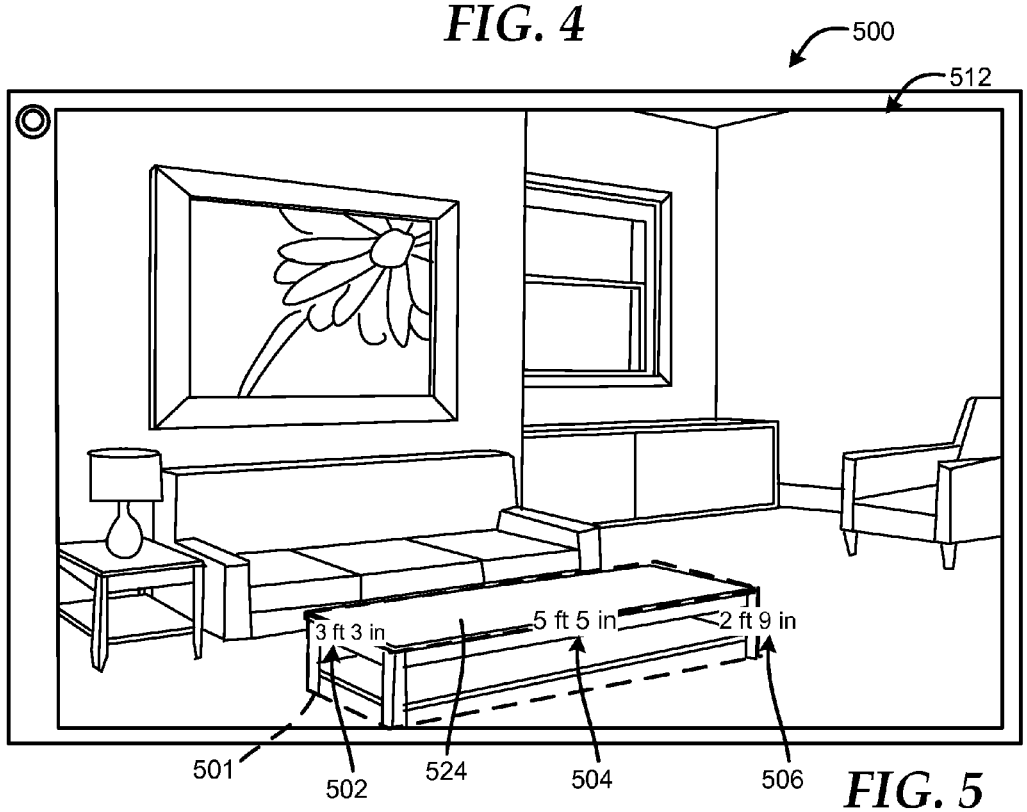

FIG. 5 illustrates an information handling system 500 including a display screen 512, which in turn provides a 3-D image according to a particular embodiment of the disclosure. As described above with respect to FIG. 4, a processor, such as processor 102 in FIG. 1, of the information handling system 500 can utilize the (X,Y,Z) coordinates of points at both ends of a width dimension, the (X,Y,Z) coordinates of points at both ends of a length dimension, and the (X,Y,Z) coordinates of points at both ends of a height dimension to calculate the dimensions of an object, such as table 524. After the dimensions of the table 524 have been calculated and stored, the processor 102 can display the values for each dimension along with lines defining the directions of the dimensions in a wireframe 501.

For example, within wireframe 501 a width 502 of the table 524 can be displayed as 3 ft. 3 in. along a line defining the width of the table, a length 504 can be displayed as 5 ft. 5 in. along a line defining the length of the table, and a height 506 can be displayed as 2 ft. 9 in. along a line defining the height of the table. An individual can view the width 502, the length 504, and the height 506 of the table 524 on the display screen 512, and can easily identify which dimension is defined as which based on the line drawn in relation to the value displayed for the dimension. Thus, the information handling system 500 can utilize (X,Y,Z) coordinates of points within a 3-D image displayed on the display screen 512 to calculate and display the width 502, the length 504, and the height 506 of an objected with only a single interaction with the individual or without any interaction with the individual.

Figure 6:
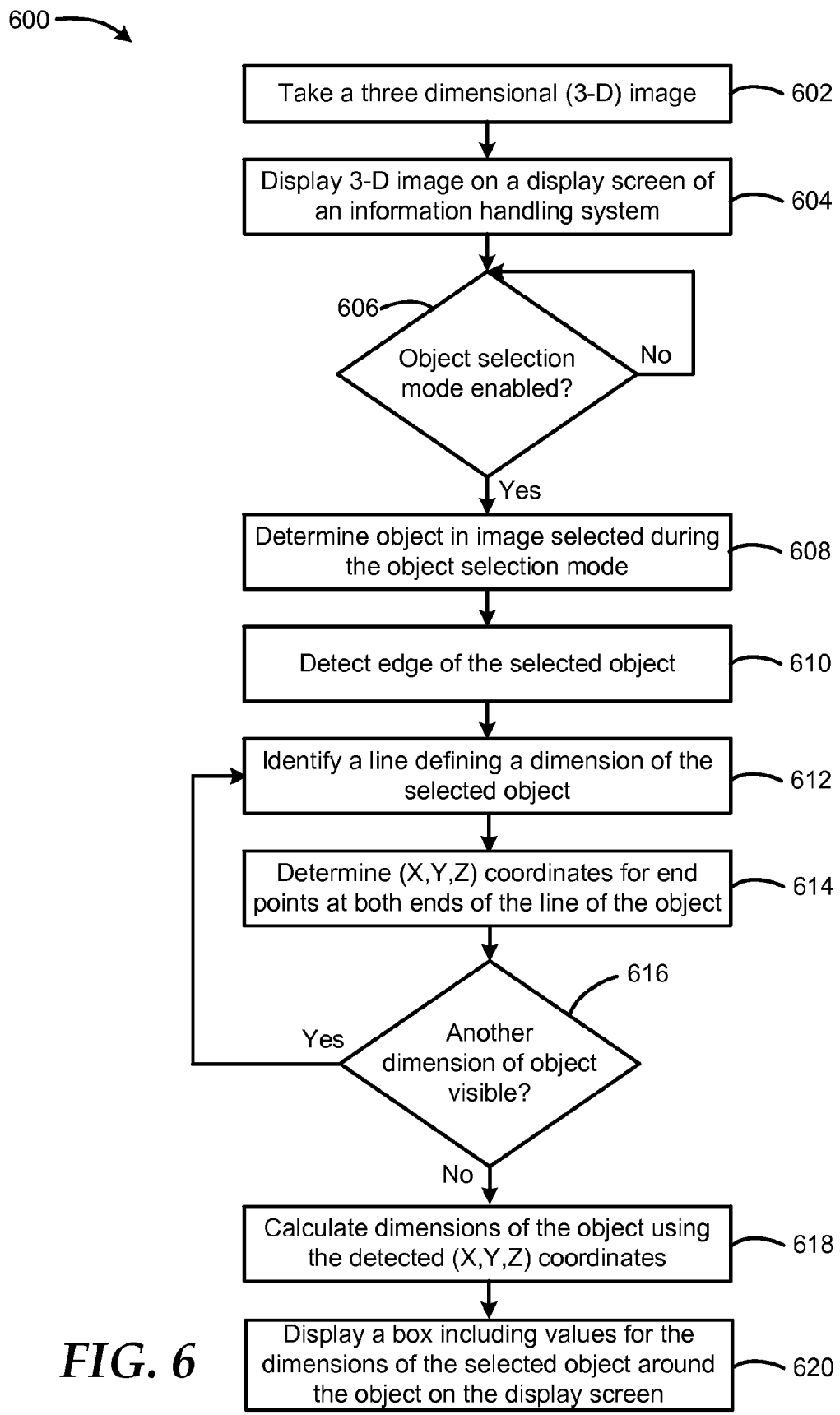
FIG. 6 is a flow diagram of a method for determining the dimensions of an object in an image according to a particular embodiment of the disclosure.

FIG. 6 shows a flow diagram of a method 600 for determining dimensions of an object in an image. At block 602, a three dimensional (3-D) image is taken. In an embodiment, the 3-D image can be taken using a camera incorporated in an information handling system, such as a tablet computer, a cellular telephone, a personal computer, or the like. Metadata including 3-D coordinates for each pixel of the image can be stored along with the 3-D image for later use by the information handling system. At block 604, the 3-D image is displayed on a display screen of the information handling system. A determination is made, at block 606, whether an object selection mode is selected. In an embodiment, the object selection mode can be a user interface application executed by a processor, such as a CPU, GPU, or the like, of the information handling system.

In response to the object selection mode being selected, a determination is made that an object in the image is selected at block 608. In an embodiment, the object can be selected in multiple ways: one or more objects can be automatically selected by a processor of the information handling system, in response to a selection drawn around or near an object on the image, in response to touching of a point on the image, or the like. In an embodiment, a processor of the information handling system can determine a prominent object within the 3-D image, and can automatically select the prominent object as the determined object of the 3-D image. In an embodiment, the object can be encompassed by a selection or a point can be clicked during the object selection mode via an individual using a finger, stylus, or other touch screen input device to draw a selection around some portion of a desired object in the 3-D image. In an embodiment, the object can be selected in response to a selection indication be drawn near the object. The selection indication can be any type of curved line, semi-curved line, shape, semi-shape, or the like being drawn on the object, within the object, around the object, partially around the object, partially within and partially outside of the object or the like.

At block 610, an edge of the selected object is determined. In an embodiment, the edge can be determined based on disparities between pixels of the image. A line defining a dimension of the selected object is identified at block 612. At block 614, the 3-D (X,Y,Z) coordinates for points at both ends of a line defining the dimension of the object are determined. For example, if the object selected is a table, the line of the object can be a first edge of the table top, and the 3-D coordinates can be determined at both ends of the first edge, such as the 3-D coordinates at a first corner of the table and a 3-D coordinates at a second corner of the table. Thus, an edge of an object does not need to be continuous as long as the start and end points are unobscured.

At block 616, a determination is made whether another dimension of the desired object is visible. If another dimension of the object is visible, the flow continues as stated above at block 612. However, if another dimension of the object is not visible, such as the 3-D coordinates for all dimensions of the object have been determined, the dimensions of the object are calculated using the 3-D (X,Y,Z) coordinates at block 618. At block 620, a shape is displayed on the image around the determined object of the image, and the shape can include values representing the dimensions of the object. In an embodiment, the displayed shape can be a dashed line or other wireframe outlining the object that the processor has determined the dimensions of.

Figure 7:
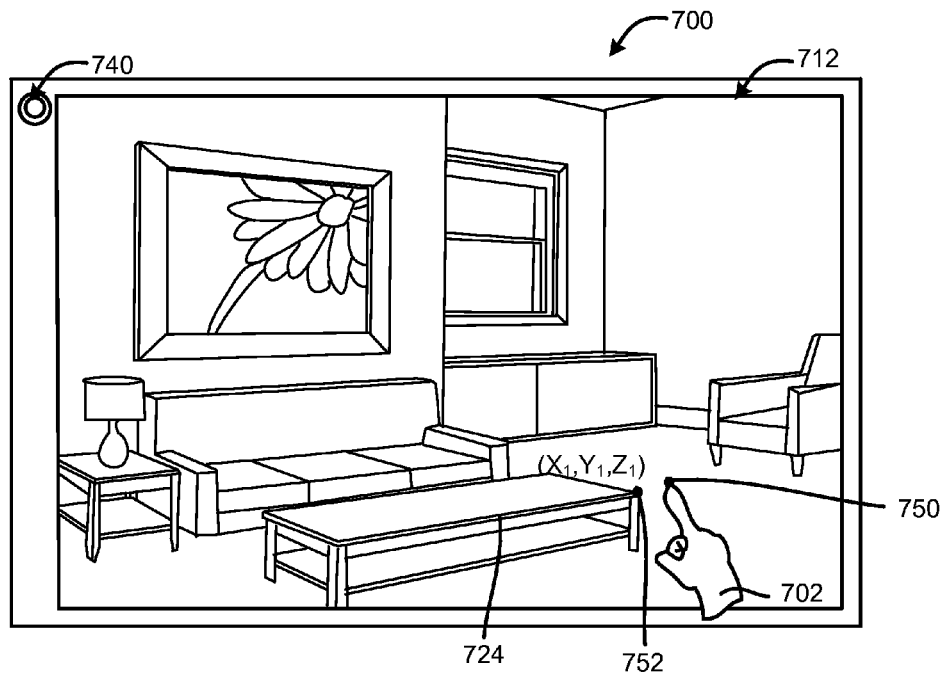
FIGS. 7-10 are diagrams of additional different shots on a display of the information handling system according to a particular embodiment of the disclosure.

FIG. 7 illustrates an information handling system 700 including a display screen 712, which in turn provides a 3-D image taken by a 3-D camera, such as camera 740, according to a particular embodiment of the disclosure. In this embodiment, an individual can utilize his or her finger 702 to interface with the display 712 and the touch controller 128, of FIG. 1, to select two points or pixels within the displayed image that the individual would like to have the distance between the two points calculated. Herein, the use of a point in the image is substantially the same as a pixel in the image.

When an individual clicks on a particular point 750 in the image, the processor 102 can determine whether that point is located at a point of disparity within the 3-D image. In an embodiment, the processor 102 can detect disparities between points or pixels based on a difference between the Z-dimension of adjacent pixels. For example, the processor 102 can detect a disparity when there is a large difference between the Z coordinate of one pixel as compared to the Z coordinate of an adjacent pixel. In an embodiment, the locations or pixels with large disparities can be pixels located along an edge or boundary of an object, such as table 724, within the image.

If the selected point 750 is not located at a large disparity, the processor 102 can then determine whether the point 750 is located within a particular distance from a point or pixel having a large disparity, such as point 752 along an edge of the table 724. In an embodiment, the particular distance can be automatically defined by the processor based on how close different objects are to each other within the 3-D image, can be set by an individual using the information handling system 700, or the like. For example, the particular distance can be set, by the processor 102, to be small enough that the processor can clearly determine an edge of object that the individual was trying to select. Thus, in the example illustrated in FIG. 7, the selected point 750 can be located within the particular distance or radius of point 752, which can have a large disparity based on point 752 being located at a corner of table 724.

The processor 102 can then redefine the location of selected point 750 to be point 752 of table 724. The redefined point 752 can have coordinates of $(X_1, Y_1, Z_1)$, which the processor 102 can utilize in calculating distances within the image, such as the length of the table as shown in FIG. 8.

Figure 8:
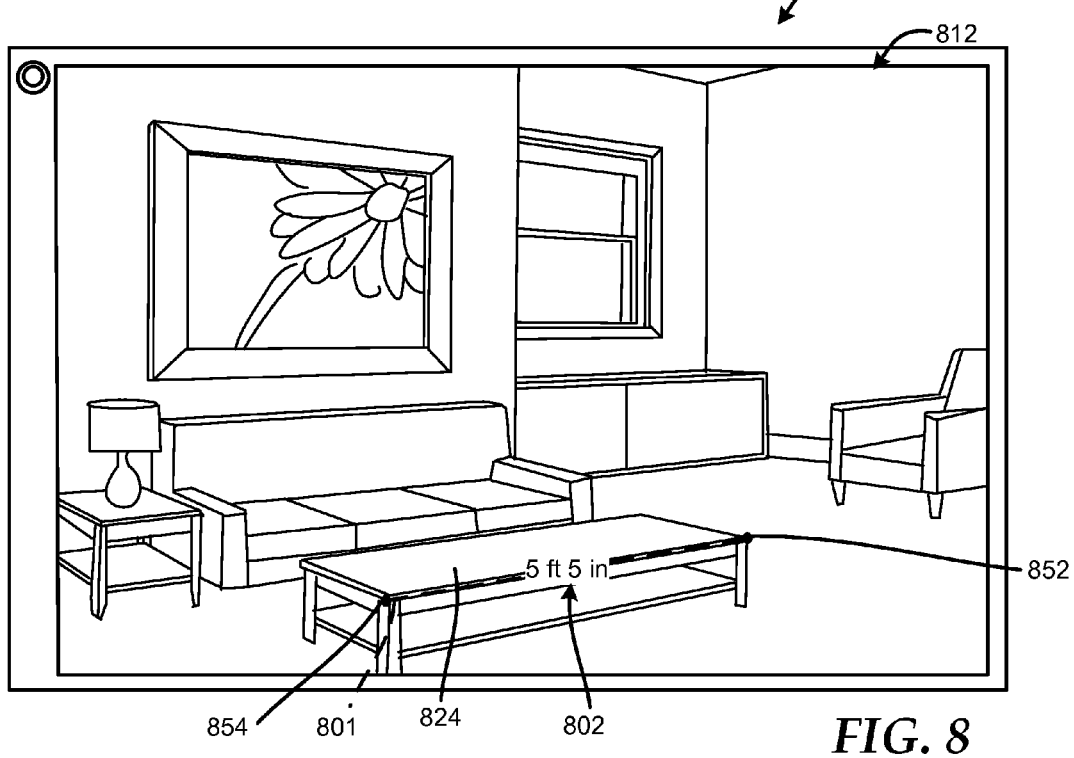

FIG. 8 illustrates an information handling system 800 including a display screen 812, which in turn provides a 3-D image taken by a 3-D camera, such as camera 840, according to a particular embodiment of the disclosure. As described above with respect to FIG. 7, the processor 102 can redefine a point in the image selected by an individual to be a point having a large disparity, such as point 852 on table 824. The processor 102 can then determine a point 854 located at a point of large disparity at the opposite end of a line 801 defining a length of the table 824.

As described above with respect to FIG. 4, the processor 102 can utilize the (X,Y,Z) coordinates of points 852 and 854 at both ends of a length dimension of the table 824 to determine the length of the table. After the length dimension of the table 824 has been calculated and stored, the processor 102 can display the value for length along with the line 801 defining length of the table 824. For example, a length 802 of the table 824 can be displayed as 5 ft. 5 in. along the line 801 defining the length of the table. Thus, the information handling system 800 can utilize (X,Y,Z) coordinates of points within a 3-D image displayed on the display screen 812 to calculate and display a dimension, such as the length 802, an objected associated with the redefined selected point 852 that is snapped to from another point based on the disparity at point 852.

Figure 9:
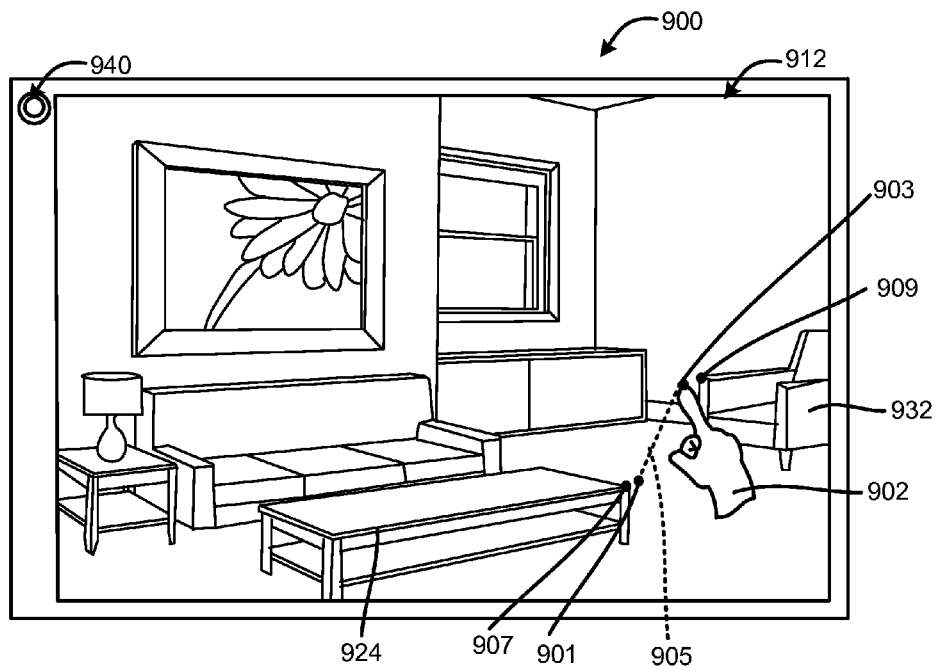

FIG. 9 illustrates an information handling system 900 including a display screen 912, which in turn provides a 3-D image taken by a 3-D camera, such as camera 940, according to a particular embodiment of the disclosure. In this embodiment, an individual can utilize his or her finger 902 to draw a line between points 901 and 903 within the displayed image that the individual would like to have the distance between the points calculated. This can be a straight line between two points or can also be an organic and arbitrary line that lies along many points. For example, the individual can draw a line between two objects in the image, can draw a line defining a height of a person in the image, can draw a line defining a complex path between and around objects, or the like.

When an individual draws a line 905 between points 901 and 903 in the image, the processor 102 can determine whether the two end points of the line are located at points with a large disparity within the 3-D image. If one or both the selected points 901 and 903 at the end of line 905 are not located at points of large disparity, the processor 102 can then determine whether the point or points are located within a particular distance from a point or pixel having a large disparity, such as points 907 and 909. In the example illustrated in FIG. 9, the selected point 901 can be located within the particular distance or radius of point 907, which can have a large disparity based on point 907 being located at a corner of table 924. Similarly, the selected point 903 can be located within the particular distance or radius of point 909, which can have a large disparity based on point 909 being located at a corner of chair 932.

The processor 102 can then redefine the location of selected point 901 to be point 907 of table 924, and can redefine the location of selected point 903 to be point 909 of chair 932. The redefine point 907 can have coordinates of $(X_1, Y_1, Z_1)$ and the redefine point 909 can have coordinates of $(X_2, Y_2, Z_2)$, which the processor 102 can utilize in calculating the distance between the table and the chair as shown in FIG. 10.

Figure 10:
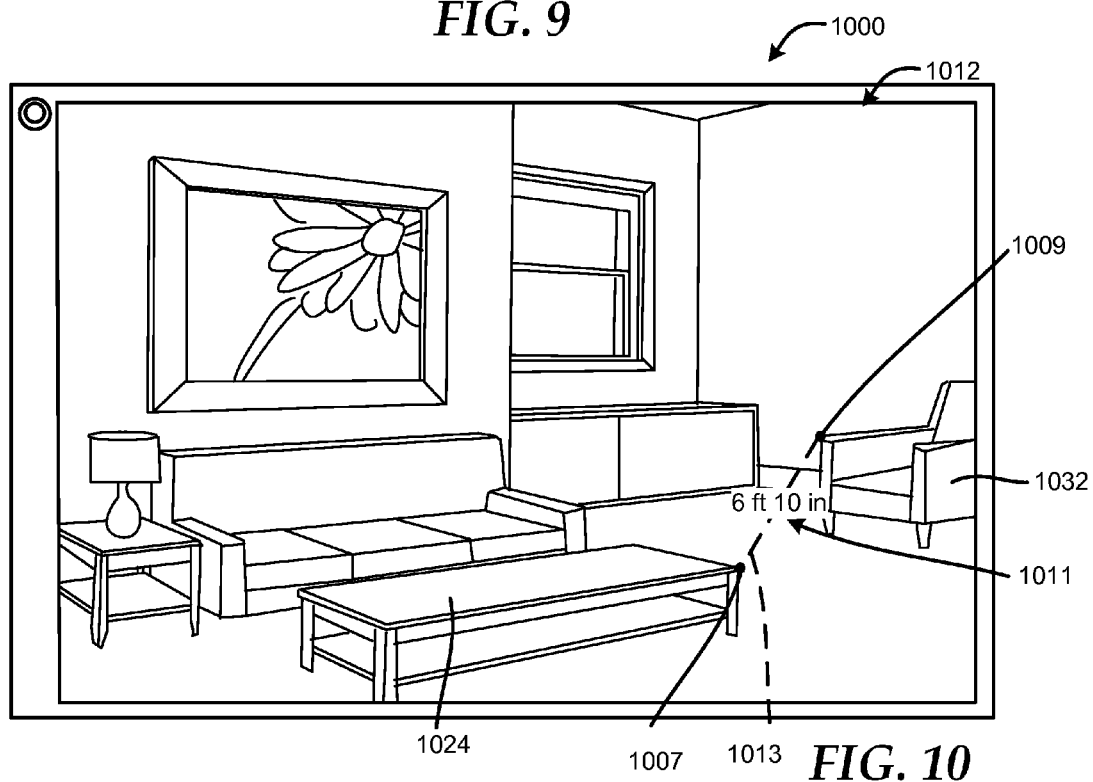

FIG. 10 illustrates an information handling system 1000 including a display screen 1012, which in turn provides a 3-D image taken by a 3-D camera, such as camera 1040, according to a particular embodiment of the disclosure. As described above with respect to FIG. 9, the processor 102 can redefine selected points at the end of a drawn line to be a large disparity point 1007 on table 1024 and large disparity point 1009 on chair 1032.

As described above with respect to FIG. 4, the processor 102 can utilize the (X,Y,Z) coordinates of points 1007 and 1009, at both ends of the drawn line, to determine the distance between the table 1024 and the chair 1032. After the distance has been calculated and stored, the processor 102 can display the value 1011 for the distance along with a line 1013 defining distance between table 1024 and the chair 1032. For example, a distance 1011 can be displayed as 6 ft. 10 in. along the line 1013 defining the distance between the table 1024 and the chair 1032. Thus, the information handling system 1000 can utilize (X,Y,Z) coordinates of points within a 3-D image displayed on the display screen 1012 to calculate and display distances between objects in the image, in response to redefining points selected by an individual to snap to points with large disparities within the image if the selected points are within a threshold specific distance from the selected points.

The threshold specific distance may be determined by a number of pixels or by a distance calculated from X, Y, Z coordinates or any combination of the same in some example embodiments. Upon selecting a point within the threshold specific distance of a disparity, a point on the disparity may be redefined as the selected point. The threshold specific distance may be determined automatically based on distances between objects in a 3-D image or may be based on a standard specific distance determined for the system. The threshold specific distance may also be configurable as to sensitivity of determining closeness to a disparity in other embodiments. Sensitivity may be broadly defined, such as low, medium, or high to select a low, medium or high threshold specific distance in certain embodiments. In other embodiments, explicit sensitivity levels may be selectable within the system.

Figure 11:
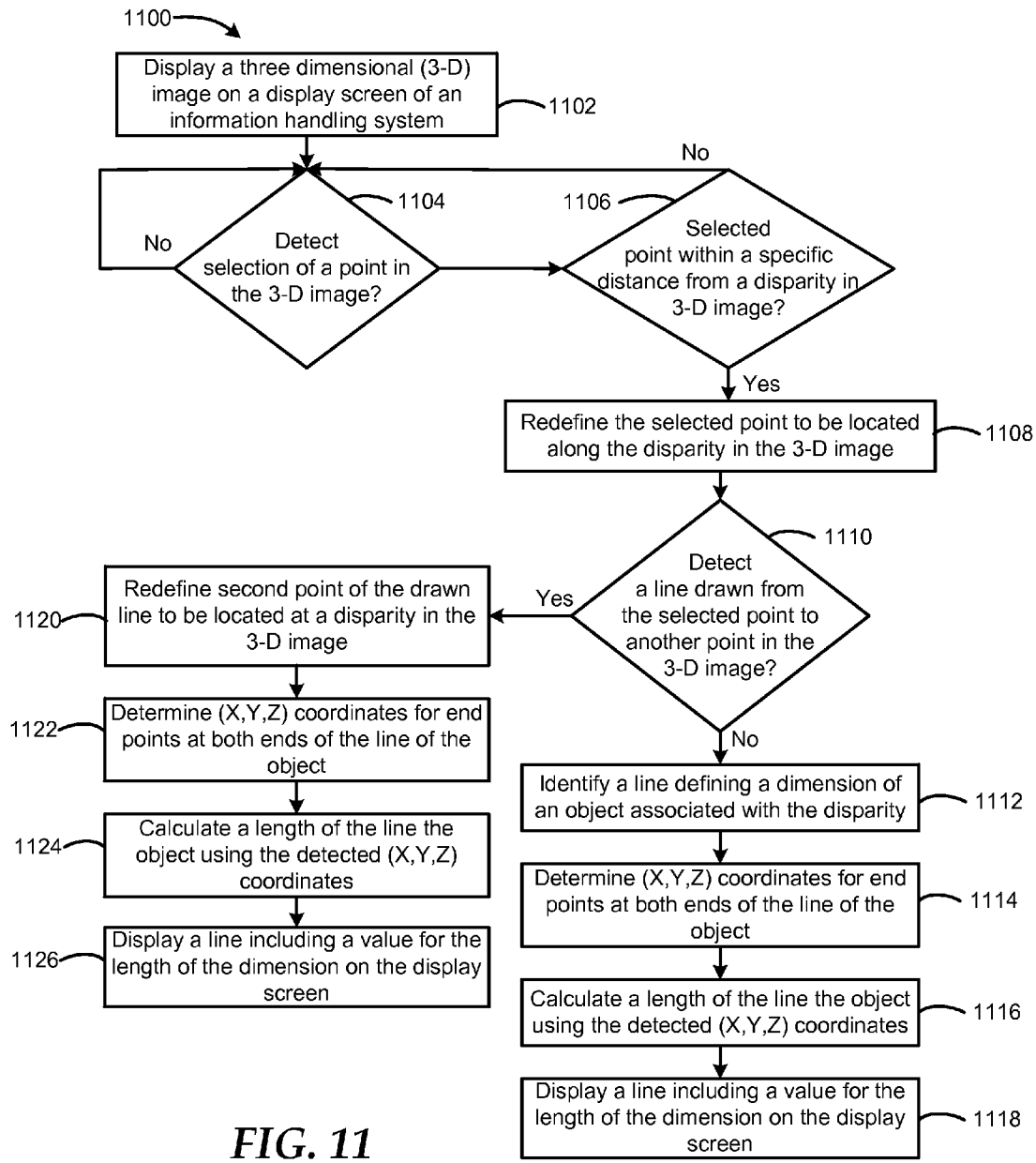
FIG. 11 is a flow diagram of a method for redefining depth-based edge snapping for point selection in an image according to a particular embodiment of the disclosure.

FIG. 11 is a flow diagram of a method 1100 for redefining depth-based edge snapping for point selection in an image according to a particular embodiment of the disclosure. At block 1102, a 3-D image is displayed on a display screen of an information handling system. At block 1104, a determination is made whether a selection of a point in the 3-D image has been detected. In an embodiment, display screen can be a touch screen, and the selection of the point can be via a finger, a stylus, a pointing device, or the like. In response to the selection of the point being detected, a determination is made whether the selected point is within a threshold specific distance from a disparity in the 3-D image at block 1106. In an embodiment, the threshold specific distance can be automatically set by a processor of the information handling system, by an individual using the information handling system, or the like.

If the selected point is not within a threshold specific distance from a point of large disparity, the flow continues as discussed above at block 1106. In an embodiment, the large disparity can define an edge of an object in the 3-D image. In an embodiment, a disparity can be differences between the Z-dimension of adjacent pixels of the 3-D image. For example, a disparity can be detected when there is a large difference between the Z coordinate of one pixel as compared to the Z coordinate of an adjacent pixel. In an embodiment, the locations or pixels with large disparities can be pixels located along an edge or boundary of an object within the 3-D image. If the selected point is within a threshold specific distance from a disparity, the selected point is redefined to be located along the disparity in the 3-D image at block 1108. At block 1110, a determination is made whether a line drawn from the selected point to another point in the 3-D image is detected. In an embodiment, the drawn line can be a distance between two objects in the image, the height of a person in the image, or the like. If the line drawn from the selected point to another point is not detected, a line defining a dimension of an object associated with the point of disparity of the redefined point is identified at block 1112.

At block 1114, the 3-D (X,Y,Z) coordinates for points at both ends of the line defining the dimension of the object are determined. For example, if the object associated with the redefined point is a table, the line of the object can be a first edge of a table top, and the 3-D coordinates can be determined at both ends of the first edge, such as the 3-D coordinates at a first corner of the table and a 3-D coordinates at a second corner of the table. The length of the line is calculated using the 3-D (X,Y,Z) coordinates at block 1116. At block 1118, a line is displayed on the image including value representing the length of the line.

If a line drawn from the selected point to another point is detected, a second point of the drawn line is redefined to be located at a disparity of the 3-D image at block 1120. At block 1122, the 3-D (X,Y,Z) coordinates for the points at both ends of the drawn line defining a distance between two object are determined. The length of the line is calculated using the 3-D (X,Y,Z) coordinates at block 1124. At block 1126, a line is displayed on the image in between the two objects including value representing the length of the line.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a three dimensional camera to capture a three dimensional image;
   a processor configured to communicate with the three dimensional camera; and
   the processor to provide the three dimensional image to be displayed on a display screen of the information handling system, to detect a selection of a first pixel within the three dimensional image that is proximate to an edge of a object in the three dimensional image, and to redefine the selected first pixel to snap to a second pixel on the edge of the object within the three dimensional image, wherein the second pixel within the three dimensional image has a large disparity within the three dimensional image.

2. The information handling system of claim 1 wherein the processor is further configured to determine whether the selected first pixel has a large disparity within the three dimensional image prior to redefining the selected first pixel to be the second pixel.

3. The information handling system of claim 1 wherein the processor is further configured to determine whether the selected first pixel is within a threshold specific distance from the second pixel prior to redefining the selected pixel to snap to the second pixel.

4. The information handling system of claim 3, wherein the processor automatically selects the threshold specific distance based on distances between objects in the three dimensional image.

5. The information handling system of claim 1, wherein a disparity is calculated based on differences between a Z coordinate of the second pixel and a Z coordinate of an adjacent pixel.

6. The information handling system of claim 1, wherein the processor is further configured to detect a line drawn between the selected first pixel and a third pixel within the three dimensional image.

7. The information handling system of claim 6, wherein the processor is further configured to redefine a location of the third pixel within the three dimensional image to be a fourth pixel within the three dimensional image having a large disparity, and to calculate a distance between the second pixel and the fourth pixel to determine distance between objects within the three dimensional image.

8. The information handling system of claim 1 wherein the processor is further configured to calculate a length of a dimension of an object associated with the second pixel in response to the selected first pixel being redefined to the second pixel.

9. A computer implemented method comprising:
   displaying a three dimensional image on a display screen;
   detecting a selection of a first pixel within the three dimensional image that is proximate to an edge of a object in the three dimensional image; and
   redefining, via a processor executing instructions, the selected first pixel to snap to a second pixel within the three dimensional image on the edge of the object, wherein the second pixel has a large disparity within the three dimensional image.

10. The computer implemented method of claim 9 further comprising:
    determining whether the selected first pixel has a large disparity within the three dimensional image prior to redefining the selected first pixel to snap to the second pixel.

11. The computer implemented method of claim 9 further comprising:
    determining whether the selected first pixel is within a threshold specific distance from the second pixel prior to redefining the selected pixel to snap to the second pixel.

12. The computer implemented method of claim 11, wherein the threshold specific distance is automatically selected based on distances between objects in the three dimensional image.

13. The computer implemented method of claim 9, wherein a disparity is calculated based on differences between a Z coordinate of the second pixel and a Z coordinate of an adjacent pixel.

14. The computer implemented method of claim 9, further comprising:
    detecting a line drawn between the selected first pixel and a third pixel within the three dimensional image.

15. The computer implemented method of claim 9, further comprising:
    calculating a length of a dimension of an object associated with an edge including the second pixel in response to the selected first pixel being redefined to snap to the second pixel.

16. The computer implemented method of claim 14, further comprising:
    redefining a location of the third pixel within the three dimensional image to be a fourth pixel within the three dimensional image having a large disparity; and
    calculating a distance between the second pixel and the fourth pixel.

17. An information handling system comprising:
    a three dimensional camera to capture a three dimensional image;
    a processor configured to communicate with the three dimensional camera; and
    the processor to provide the three dimensional image to be displayed on a display screen of the information handling system, to detect a line drawn between a first pixel within the three dimensional image that is proximate to an edge of a first object and a second pixel within the three dimensional image, to redefine the first pixel to snap to a third pixel within the three dimensional image on the edge of the first object, and to redefine the second pixel to snap to a fourth pixel within the three dimensional image, wherein the third pixel and the fourth pixels have a large disparity within the three dimensional image.

18. The information handling system of claim 17, wherein a pixel disparity is calculated based on differences between a Z coordinate of a pixel and a Z coordinate of an adjacent coordinate.

19. The information handling system of claim 17, wherein the processor is further configured to calculate a distance between the third pixel within the three dimensional image and the fourth pixel within the three dimensional image.

20. The information handling system of claim 17 wherein the second pixel is located proximate to an edge of a second object and the fourth pixel is located on an edge of a second object in the three dimensional image.

* * * * *